(No Model.)
G. H. BURROWS.
AIR SUPPLYING APPARATUS FOR CARBURETORS.
No. 522,573. Patented July 3, 1894.
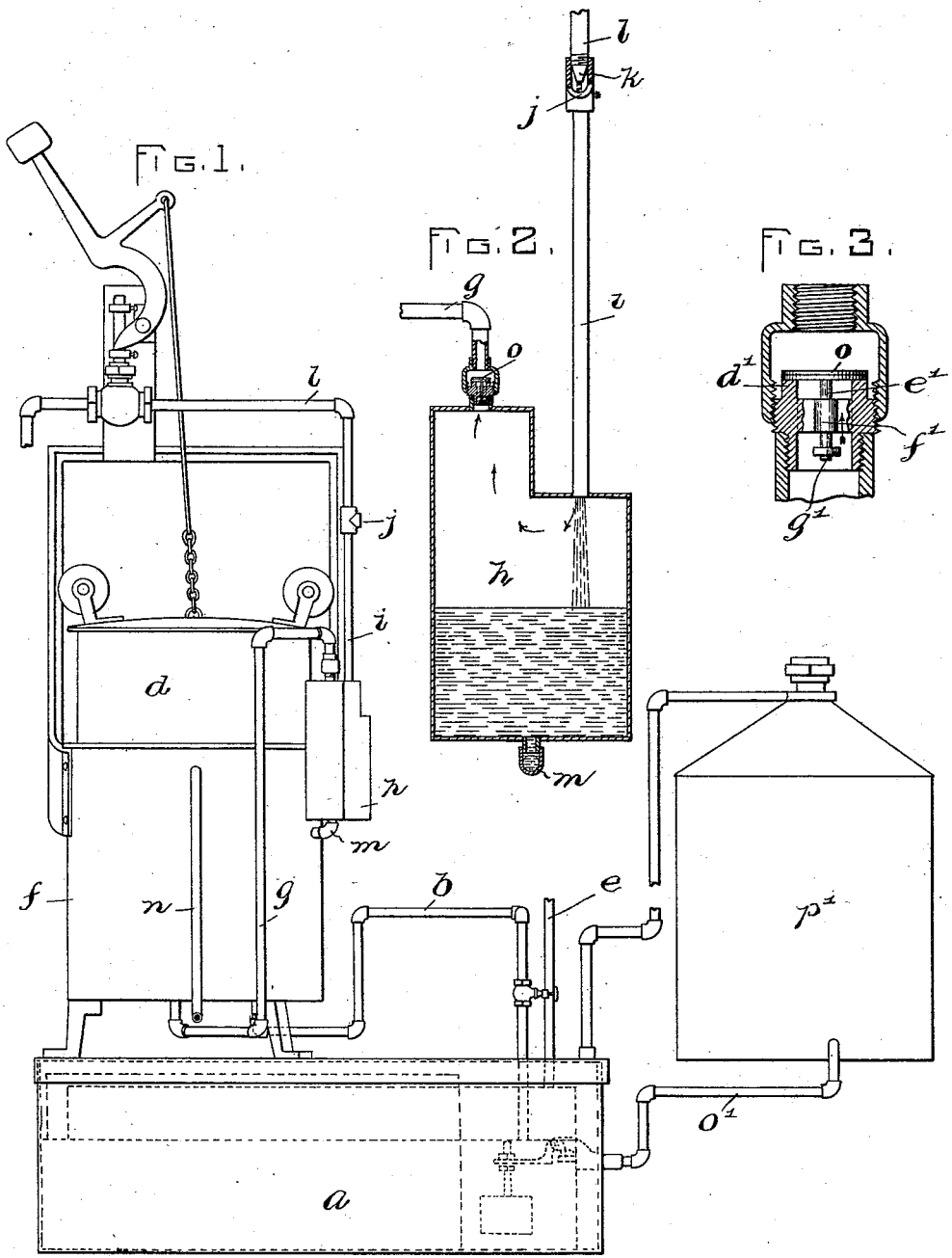

UNITED STATES PATENT OFFICE.

GEORGE H. BURROWS, OF SOMERVILLE, MASSACHUSETTS.

AIR-SUPPLYING APPARATUS FOR CARBURETORS.

SPECIFICATION forming part of Letters Patent No. 522,573, dated July 3, 1894.

Application filed November 25, 1893. Serial No. 491,993. (No model.)

*To all whom it may concern:*

Be it known that I, GEORGE H. BURROWS, of Somerville, in the county of Middlesex and State of Massachusetts, have invented certain new and useful Improvements in Air-Supplying Apparatus for Carburetors, of which the following is a specification.

This invention relates to air-supplying apparatus for carburetors of the class in which a current of air is forced into a floating reservoir or holder by a "tromp," the water being being shut off to stop the supply of air when the floating holder which receives the air rises to a given point, and turns on the water to renew the air-supply when the said holder sinks to a minimum height. The air passes from the floating chamber to the carbureting chamber, where it is mixed with the hydro-carbon vapor in said chamber.

The present invention has more particularly in view certain improvements in the apparatus shown and described in Patent No. 427,832, granted to me May 13, 1890, whereby greater simplicity and practicability in structure are secured.

To these ends, the invention consists in the several improvements which I will now proceed to describe and claim.

Of the accompanying drawings, forming part of this specification: Figure 1 represents a side elevation of an apparatus embodying my improvements. Fig. 2 represents a sectional view of an air and water reservoir and its connections hereinafter described. Fig. 3 represents an enlarged sectional detail of the check-valve hereinafter referred to.

The same letters of reference indicate the same parts in all the figures.

In the drawings: $a$ represents the carbureting tank or chamber, in which the carburetor is placed, and in which air and hydro-carbon vapors are mingled to form illuminating or heating gas. Air is admitted to said carburetor and chamber through a pipe $b$ from the floating holder $d$, said floating holder being of the form shown and described in my former patent above referred to, and the resulting gas or mixture of gases and vapors is conducted from the chamber through a pipe $e$ to the burners.

The inverted tank or air-holder $d$ floats in water in an annular tank $f$. The pipe $g$, which admits air to the floating holder, communicates with a chamber or trap $h$, which chamber also communicates with a vertical pipe $i$, having an opening $j$ above said chamber for the admission of air, and a nozzle $k$, which is supplied with water by a water-pipe $l$, communicating with a source of water-supply. The pipe $i$ and nozzle $k$ constitute the tromp. The downward flow of a stream of water through the pipe $i$ induces a current of air through said pipe, the water and air entering the chamber $h$ together. The water escapes from the chamber $h$ through a pipe $m$, intermediate of the chamber and water tank $f$, from which it escapes through a pipe $n$, the outlet of which is at the proper height to maintain the water in the tank $f$ (Fig. 1), and the air passes from said chamber through the pipe $g$ to the floating holder. The pipe $g$ is provided with a check-valve at the point of its connection with the chamber $h$, which prevents the air from the air-holder $d$ being forced back through the pipe and tromp (Figs. 2 and 3). The means for automatically controlling the water-supply through the pipe $l$ by the amount of air in the holder $d$ are the same as shown and described in my former patent above referred to.

The pipe $g$, which conducts the air to the floating holder, has at its junction with the chamber $h$ an annular valve $o$, resting upon a seat $d'$, and having a downwardly-projecting stem $e'$ supported in a guide $f'$, and a nut $g'$ secured to the lower end of the stem to limit the opening of the valve. When air is forced by the injector into the chamber $h$, the valve yields to the pressure of the air and rises from its seat, thus permitting the air to pass into said holder; and, when the introduction of air is suspended by the shutting off of the water-supply, the valve is seated by the back pressure of air in the holder in contact with the upper surface of the valve through the pipe $g$. I find that this form of valve is more certain and reliable in its action than one which is hinged, it being less liable to become clogged by impurities in the vapor, and affording a wider opening when removed from its seat.

Having thus described my invention, what I claim as new, and desire to secure by Letters Patent, is—

1. In a carbureting apparatus, the combination of a trap, a tromp communicating therewith, a water-containing tank, a water conduit connecting the latter with the trap, an inverted air-holder in the tank, and an air-conduit connecting said holder and the trap.

2. In a carbureting apparatus, the combination of a trap, a tromp communicating therewith, an inverted floating air-holder, an air-conduit connecting the trap and air-holder and having a valve-seat and guide, and a check-valve adapted to said seat and having a stem engaging the guide.

In testimony whereof I have signed my name to this specification, in the presence of two subscribing witnesses, this 22d day of November, A. D. 1893.

GEORGE H. BURROWS.

Witnesses:
C. F. BROWN,
A. D. HARRISON.